United States Patent Office 3,592,834
Patented July 13, 1971

3,592,834
ORGANO-SILICA POLYMERS
Stanley J. Buckman, Rudolf F. Land, and Michael L. Mishler, Memphis, Tenn., assignors to Buckman Laboratories, Inc., Memphis, Tenn.
No Drawing. Filed Jan. 27, 1969, Ser. No. 794,349
Int. Cl. C07f 7/02, 7/04
U.S. Cl. 260—448.8A                                   15 Claims

ABSTRACT OF THE DISCLOSURE

Organo-silica polymers having the formula:

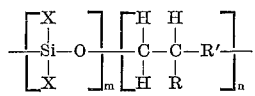

wherein $m$ and $n$ are integers independently representing the number of units; R represents —H, —CN, —CONH$_2$, —CONH$_3^{\oplus}$, —COOH, —COO$^{\ominus}$, —COOM, COOR″; R′ represents —NH—, —NH$_2^{\oplus}$—, —NR″—, —NR″H$^{\oplus}$—, —NR″$_2^{\oplus}$—, —CH$_2$—CHR—; and whenever R′ contains nitrogen, R″ represents an alkyl or aryl radical; M represents an alkali metal; X represents an —OH, —O$^{\ominus}$, —OM; are suitable as sequestering, dispersing, and flocculating agents.

---

This invention relates to anionic and cationic polymers which have sequestering, dispersing, and flocculating properties. More particularly, our invention relates to organo-silica polymers having such properties. This invention also provides methods for the preparation of such polymers.

In view of the rapidly increasing importance of stream pollution, many attempts have been made in an effort to alleviate this problem. Perhaps the most successful as practiced by industry is the reuse of process waters. This has been only partially successful because the continued reuse of the process water rapidly increases the concentration of the contaminants in the water to such an extent that the water is no longer suitable for industrial use. When this condition is reached, the process water must be either discharged as waste or the contaminants must be removed. Discharging as waste is impractical and is not permitted in many cases. It, therefore, follows that the removal of these contaminants becomes mandatory under such conditions. To remove these contaminants more economically, more efficient materials and methods are needed.

It is, therefore, a principal object of this invention to provide new organo-silica polymers for use in water treatment which are capable of sequestering, dispersing, and flocculating undesirable ions and particulate matter so that said ions and particulate matter may be removed from water supplies or rendered unobnoxious prior to the initial use or reuse of the water.

It is another object of the present invention to provide processes for the manufacture of said new organo-silica polymers.

Other objects and advantages of the invention will become apparent as the description proceeds.

In brief, the foregoing objects and advantages are attained by the use of new compounds of the composition produced by a method which comprises reacting a polymeric silica with an organic monomer or prepolymer. Somewhat more specifically, the polymeric silica contains Si—OH and/or Si—O bonds and the organic monomer and/or the organic prepolymer contains at least one carbon to carbon double bond, azirane, or halogen. The organic compound must also contain an activating group such as a carboxyl, nitril, or an amide.

The process for preparing the organo-silica polymers may be illustrated structurally involving addition, condensation, and/or ring opening reactions as follows:

Addition reaction:

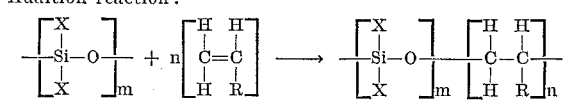

Condensation reaction:

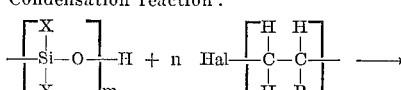

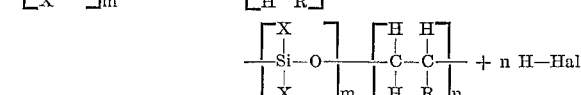

Ring of opening reaction:                    Hal-halogen

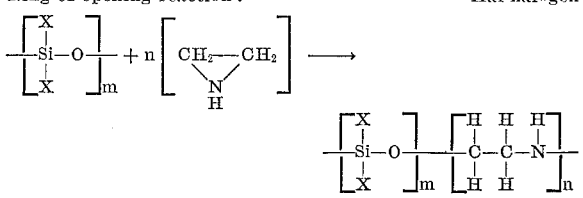

Suitable types of polymeric silica for use in our invention include alkali-metal silicates and silica. A wide range of alkali-metal silicates are suitable for use in our invention. Examples of suitable alkali-metal silicates include sodium silicates wherein the ratio of SiO$_2$/Na$_2$O varies from about 3.75 to 1.65 and potassium silicates wherein the ratio of SiO$_2$/K$_2$O varies from about 2.5 to 1.8. In order to obtain stable liquid reaction products, additional sodium or potassium hydroxide are added to the silicates with increased amounts being required for systems of higher concentrations. The final molar ratios of SiO$_2$/Na$_2$O and SiO$_2$/K$_2$O may be as low as 0.3 to 0.5 with systems of 30 to 50 percent concentration.

Suitable types of silica are those of colloidal dimensions including the well known forms of silica such as (1) silica aerogel, a colloidal silica which may be prepared by displacing the water from a silica hydrogel by a low-boiling, water-miscible, organic liquid, heating in an autoclave or the like above the critical temperature of the liquid, and then venting the autoclave, (2) so-called fume silica, a colloidal silica obtained by burning silicon tetrachloride and collecting the resulting silica smoke, and (3) a precipitated silica prepared under conditions which do not permit the formation of a gel structure, but rather cause the flocculation of silica particles into coherent aggregates such as by the addition of sodium ions to a sodium silicate solution. Colloidal precipitated silica sold under the trademark QUSO G-30 is a preferred type of silica.

The following examples are given for the purpose of illustrating the present invention and are not to be deemed a limitation thereof.

EXAMPLE 1

Liquid anionic acrylonitrile-silica reaction product

A charge consisting of 18.1 ml. of distilled water, 27.2 grams of 50 percent aqueous caustic sodium hydroxide (0.34 mole) and 40.4 grams of an alkaline sodium silicate solution containing 25.3 percent SiO$_2$ (0.17 mole) and 6.8 percent Na$_2$O (0.04 mole) was mixed at room temperature in a 200-ml. flask equipped with a thermometer, stirrer, addition funnel and water cooled condenser. The solution was heated to 52° C. under stirring and 14.3 grams of acrylonitrile (0.27 mole) was added dropwise at this temperature over a 4-hour period. After addition of acrylonitrile, the reaction mixture was heated to 91° C. and held for one hour under stirring, followed by sparging with air for 3 hours at 82° C. to remove free ammonia of hydrolysis. Sparging was considered complete after the $NH_3$ content had dropped below 0.1 percent. The liquid product was allowed to cool to room temperature and the final weight was adjusted to 100 grams by addition of water.

EXAMPLE 2

Solid anionic acrylonitrile-silica reaction product

A 4000-ml. reaction kettle equipped with a thermometer, stirrer, addition funnel, and water cooled condenser was charged at room temperature with 1600 ml. of distilled water and 894 grams of an alkaline sodium silicate solution containing 25.3 percent $SiO_2$ (3.77 moles) and 6.8 percent $Na_2O$ (0.98 mole). The solution was heated to 98° C. under stirring and 105 grams of acrylonitrile (1.98 moles) was added dropwise at this temperature over a 35 minute period. The temperature dropped to 88° C. at the end of this time. After the addition of the acrylonitrile the reaction mixture was heated to 98° C., reached this temperature after 45 minutes, and was held there for 15 minutes. Stirring continued for 2 hours while the reaction mixture cooled down. The product was precipitated from the reaction mixture with 1800 ml. of acetone, recovered by filtration and washed with 900 ml. of acetone.

EXAMPLE 3

Liquid cationic ethylenimine-silica reaction product

A charge consisting of 50 ml. of distilled water, 80 grams of 50 percent aqueous NaOH solution (1.0 mole of NaOH), and 237 grams of an alkaline solution of sodium silicate containing 25.3 percent $SiO_2$ (1.00 mole) and 6.8 percent $Na_2O$ (0.26 mole) was mixed in a 500-ml. flask equipped with a thermometer, stirrer, addition funnel and a water cooled condenser. Forty-three grams of a 50 percent aqueous solution of ethylenimine (0.5 mole) was added dropwise over a 4-hour period with stirring and gradual heating, attaining a temperature of 75° C. at the end of this time. After cooling to room temperature, the liquid, a water immiscible product, settled to the bottom, while the upper aqueous layer was discarded.

EXAMPLE 4

Solid cationic ethylenimine-silica reaction product

A 500-ml. flask equipped with a thermometer, stirrer, addition funnel, and a water cooled reflux condenser was charged with 237 grams of an alkaline solution of sodium silicate containing 25.3 percent $SiO_2$ (1.0 mole) and 6.8 percent $Na_2O$ (0.26 mole). Under stirring and with the temperature held at 31° C., a solution of 43.1 grams of ethylenimine (1.0 mole), 48.0 grams of water and 1.0 gram of NaOH (0.025 mole) were added dropwise over a 2 hour 15 minute period. At the completion of the addition, the temperature was raised to 80° C. and held for 1 hour. During the addition, a solid was continuously formed. After cooling to room temperature, the solid product was separated by decantation and air dried.

EXAMPLE 5

A paste anionic-cationic acrylamide-silica reaction product

A total of 18.5 grams of an acrylamide sulfate slurry (0.11 mole) was put in a 500-ml. flask equipped with a thermometer, stirrer, addition funnel, and a water cooled condenser. One hundred grams of an alkaline sodium silicate solution containing 25.3 percent $SiO_2$ (0.42 mole) and 6.8 percent $Na_2O$ (0.11 mole) was added slowly with stirring. The reaction was exothermic resulting in the formation of two phases, homogenized into a paste upon the addition of a small amount of water.

EXAMPLE 6

A dispersed cationic acrylonitrile-silica reaction product

A charge consisting of 310 grams of mineral seal oil, 17 grams of acrylonitrile (0.32 mole), and 25 grams of colloidal silica (0.42 mole) was mixed in a 500-ml. flask at room temperature equipped with a thermometer, stirrer and a reflux condenser. The mixture was heated to 80° C. and this temperature held for 45 minutes. The product obtained was a homogeneous dispersion showing thixotropic properties.

EXAMPLE 7

A solid, anionic, β-chloropropionitrile-silica condensation product

A 500-ml. flask equipped with a thermometer, stirrer, addition funnel and a water cooled condenser was charged with 100 ml. of distilled water, and 100 grams of an alkaline sodium silicate solution containing 25.3 percent $SiO_2$ (0.42 mole) and 6.8 percent $Na_2O$ (0.11 mole). The reaction mixture was heated to 45° C. with stirring and 9.8 grams of β-chloropropionitrile (0.11 mole) was added over a 5-minute period. The temperature was raised to 60° C. and held at this temperature for 1 hour. The product obtained was a white solid of low water solubility.

The organo-silica polymers of this invention have a broad range of utility and have many uses in addition to those involved in the treatment of fresh water and various industrial process waters. For example, the anionic polymers may serve as crosslinking agents in coating resins, polymers, and plastics; as heat stabilizers when used in the form of barium and/or cadmium salts; as dispersing agents in many processes and products; as wet strength and formation improving agents for paper products; as regulators of particle size in suspension polymerization; and as buffering agents in various industrial processes.

The cationic polymers may serve as precipitants and flocculants in various industrial processes, accelerators for polymerizing and curing reactions, anti-static agents for plastics and textiles, curing agents for epoxy resins, wet strength and formation aids for paper products, etc.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. Linear or cross-linked organo-silica polymers having the formula:

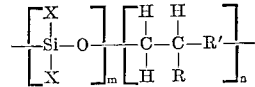

wherein $m$ and $n$ are integers independently representing the number of units; R represents —H, —CN, —$CONH_2$, —$CONH_3^\oplus$, —COOH, —$COO^\ominus$, —COOM, —COOR″; R′ represents —NH—, —$NH_2^\oplus$—, —NR″—, —NR″$H^\oplus$—, —$NR″_2^\oplus$—, —$CH_2$—CHR—; and whenever R′ contains nitrogen, R is hydrogen; R″ represents an alkyl or aryl radical; M represents an alkali metal; X represents an —OH, —$O^\ominus$, —OM.

2. The polymer of claim 1, wherein R=—CN.
3. The polymer of claim 1, wherein R=$CONH_2$.
4. The polymer of claim 1, wherein R=$CONH_3^\oplus$.
5. The polymer of claim 1, wherein R=COOH.
6. The polymer of claim 1, wherein R=$COO^\ominus$.
7. The polymer of claim 1, wherein R=—COOM.
8. The polymer of claim 1, wherein R=COOR″.
9. The polymer of claim 1, wherein R=H and R′= —NH—.

10. The polymer of claim 1 wherein R=H and R'= —NH$_2^\oplus$—.

11. The polymer of claim 1, wherein R=H and R'= —NR''—.

12. The polymer of claim 1, wherein R=H and R'= NR''H—.

13. The polymer of claim 1, wherein R=H and R'= —NR''$_2^\oplus$—.

14. The polymer of claim 1, wherein $$R' = -CH_2-CHR-.$$

15. A method of preparing organo-silica polymers having the formula of claim 1, which comprises reacting a polymeric silica compound selected from alkali-metal silicates or colloidal silica containing at least one of the bonds Si—OH or Si—O with an organic comonomer or organic prepolymer containing at least one carbon to carbon double bond and also containing an activating group selected from the group consisting of carboxyl, nitril, or amide, whereby the reaction between said organic comonomer or organic prepolymer and said polymeric silica compound takes place by a condensation reaction.

References Cited
UNITED STATES PATENTS

| | | | |
|---|---|---|---|
| 3,278,484 | 10/1966 | Tesoro | 260—46.5 |
| 3,278,485 | 10/1966 | Morgan et al. | 260—46.5 |
| 3,392,144 | 7/1968 | Holub | 260—46.5 |

TOBIAS E. LEVOW, Primary Examiner

W. F. W. BELLAMY, Assistant Examiner

U.S. Cl. X.R.

260—448.2N, 448.2E; 117—155R; 210—54